Patented Mar. 8, 1938

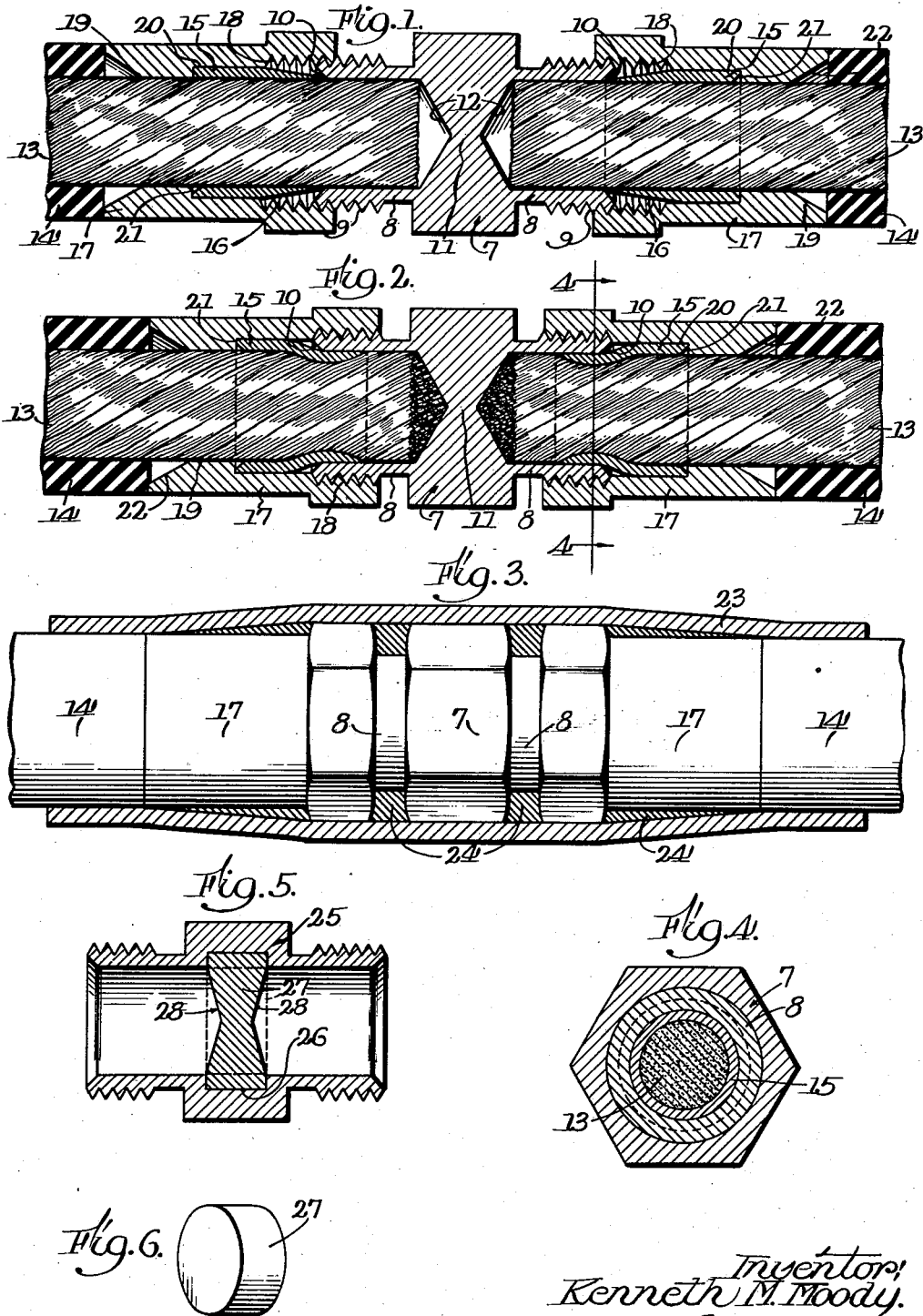

2,110,421

UNITED STATES PATENT OFFICE 2,110,421

WIRE CONNECTER

Kenneth M. Moody, Chicago, Ill., assignor of one-half to Glenn S. Noble, Chicago, Ill.

Application August 26, 1935, Serial No. 37,823

3 Claims. (Cl. 173—263)

This invention relates to means for connecting the ends of wires or cables to each other as for making a coupling, or connecting one end to another member such as a box or fitting and is particularly intended for splicing electric cables formed of a plurality of wire strands. I am aware that devices of this kind have heretofore been proposed, and shown in prior patents but in some of these devices split sleeves are used for engagement with the ends of the cable and it has been found that these are not efficient inasmuch as strands of the cable are apt to enter the slots in the sleeves and interfere with the tightening of the same against the cable and frequently instead of the sleeve gripping the cable it will only pinch a few of the strands so that it does not make an effective splice or coupling.

In accordance with the present invention I provide a novel cable splicer which overcomes the objectionable features of such prior devices and serves in effect as a drawing tool to draw and compress sleeves around the ends of the cables and also provides an improved method of making a splice or connection between the end of a cable and a splicing member.

The objects of this invention are to provide an improved wire connecter for stranded cables which can be readily applied and which will make a particularly efficient electrical and mechanical connection between the ends of the cables; to provide a connecter having an integral or fixed cross wall or web with means for drawing the ends of the cables into intimate contact therewith and holding them in such position; to provide a tubular splicer having a seat or socket therein for engagement with the end of a cable and means for compressing the end of the cable and forcing it against such seat or socket; to provide a splicer or cable coupling which will be substantially impervious to liquids or gases in order to prevent corrosion; to provide an improved method of splicing stranded electric cables; and in general to provide such further advantages and improvements as will appear more fully from the following description.

In the accompanying drawing illustrating this invention,

Figure 1 is a longitudinal sectional view of a connecter embodying this invention with the parts shown in position for assembling but before being tightened;

Figure 2 is a similar view showing the completed joint or splice;

Figure 3 is a longitudinal view partly in elevation and partly in section showing means for covering or protecting the splice or coupling;

Figure 4 is a sectional view taken on the line 4—4 of Figure 2;

Figure 5 is a longitudinal sectional view showing a modified form of construction; and Figure 6 is a perspective view of the cross wall or center socket member shown in Figure 5 as it appears before being inserted.

In the particular form of the invention shown in this drawing, the main body 7 of the connecter is hexagonal in cross section or otherwise formed for convenient engagement by a tightening tool such as an ordinary wrench. The body 7 has outwardly extending projections 8 with screw threads 9 for coacting nuts or coupling members. The projections 8 are hollow or cylindrical and their inner walls are curved or tapered at the outer ends as shown at 10 to provide drawing or compressing surfaces. The coupling has a center cross wall or contact member 11 with tapered sockets or recesses 12 in either side thereof in axial alignment with the centers of the tubular projections, for receiving and compressing the ends of the cables.

The wires or cables 13 will ordinarily be formed of a plurality of strands and provided with insulating covering 14 such as commonly used for flexible electric conductors. Sleeves 15 formed of suitable material for drawing or compression, such as soft brass or the like, are provided for engagement with the cables adjacent to the ends. The inner diameters of these sleeves are such that they will fit closely over the cables and the inner ends of the sleeves are tapered or beveled as shown at 16 for engagement with the tapered or beveled surfaces 10 of the central coupling member. Shells or tubular members 17 are tapped or threaded at 18 to provide nuts for drawing the parts together. The outer portions 19 of these shells fit closely over the cables and are recessed as shown at 20 for receiving the sleeves 15, the shoulders 21 at the bottoms of the recesses engaging with the outer ends of said sleeves.

The outer ends of the nuts 17 are tapered or bell-shaped as shown at 22 for convenience in inserting the ends of the cables, particularly if the same are frayed. It will be noted that the inner diameters of the cable engaging portions of the nuts, the sleeves, and the bores of the projections 8 are all of approximately the same diameter as shown in Figure 1. When a coupling or splice is to be made, portions of the insulating coverings 14 are removed to expose sufficient lengths of the cables 13 at the ends to be connected. The nuts are screwed onto the threaded projections a sufficient distance to hold the sleeves and the nuts in position for inserting the ends of the cables. These ends are then shoved in until they engage with the seats or sockets 12. The nuts are then tightened, which causes the tapered ends of the sleeves to engage with the drawing or tapered surfaces 10 and to be immediately forced inwardly to start to compress and grip the adjacent portions of the cable, so that the cables are also forced inwardly along with the sleeves. The further tightening of the nuts causes the inner portions of the sleeves to be further drawn or compressed and tightened against the cables while at the same time being tightly pressed against the inner surfaces or walls of the bores of the projections 8. The inward or longitudinal movement of the ends of the cables causes them to be jammed or forced tightly into the sockets and against the bridge wall 11. When the nuts have been fully tightened and the parts drawn to connected position as shown in Figure 2, the extreme ends of the cables will be found to be compacted into a solid mass against the sockets, thus making an exceedingly effective electric connection. At the same time the drawing and compressing of the sleeves around the cables adjacent to the ends causes intimate contact to be made between the cables and the sleeves and between the sleeves and the body member, thus further insuring suitable electric contact. At the same time the drawing action on the sleeves makes a substantial closure so that there is little or no possibility of liquids or gases entering into the joint and corroding the contact members.

After the coupling or splice has been made, the sleeves 15 will retain their shape and will bind the ends of the cable wires together so that, if desired, the coupling members may be disconnected and again connected, thus providing a detachable coupling for the purposes indicated.

In some instances it may be desired to further protect and insulate the connecter, and in order to do this I provide a flexible tubular cover 23 which may be made of rubber, rubber hose, leather, or other flexible or resilient material so that it may be slipped over the coupling and the ends will make tight contact with the insulation 14 on the cables. This cover may be further held in position and the joint more securely protected by placing cementitious, non-conducting material such as asphalt or the like 24 as a packing around the joint members within the covering as will be readily seen from Figure 3.

In the form shown in Figures 1 and 2, the coupling members may of course be made of any suitable material such as brass or other copper compound and it will be noted that the cross section of the metal of the connecter is equal to or greater than the cross section of the contacting cable ends, which is desirable to provide suitable conductivity. In some instances it may be desired to make the connecting members of less conductive material or non-corrosive material, or even of insulating material. Under such circumstances the form of connecter shown in Figure 5 may be used. In this instance the body 25 has a central annular groove 26 for receiving a socket or cross web member 27 such as shown in Figure 6. This member may be in the form of a disc or short cylinder which is held centrally in the bore of the body portion as indicated in dotted lines in Figure 5, preparatory to being expanded into the groove. This may be done by means of suitable punches which form sockets or depressions 28 in the ends of the cylinder and simultaneously expand the cylinder into the peripheral groove. This cylinder or cross web may be made of copper or other material of high conductivity so that the current will pass readily from the end of one conductor through the same to the end of the other conductor with little or no current passing through the other connecter members.

While I have shown a cable splicer for coupling the ends of cables in axial alignment, it will be apparent that the essential features of my invention may be utilized in making couplings or splices with the cables at various angles to each other and the coupling may be used to unite a conductor to an end or terminal connection other than a cable or wire. It will also be obvious that the splice may be made with ends having recesses of different diameters for connecting cables of different sizes together, and other changes and modifications may also be made in order to adapt the same for different purposes without departing from the scope of the invention as set forth in the following claims, in which I claim:

1. A stranded electric cable connecter comprising a coupling having an externally threaded socket with a closed bottom and having a short inner beveled portion at its outer end providing a drawing ring, a cylindrical sleeve having a shoulder at one end and tapered externally at the opposite end with a gradual taper terminating in a substantially fin edge which is adapted to be forced into the tapered end of the socket, a tubular member which is threaded to engage with the threaded socket, the inner diameter of said tubular member, sleeve and socket being substantially the same, said tubular member having a recess for receiving the sleeve, the end of the recess being formed by a shoulder which engages with the outer end of the sleeve, the outer end of the tubular member having a tapered throat to permit the ready insertion of a cable therein, said sleeve being sufficiently short so that the threads on the tubular portion may engage with some of the threads on the socket to hold the sleeve therein preparatory for the coupling operation, said operation being completed after the cable is inserted by turning the tubular portion which causes the tapered end of the sleeve to be forced into the outer end of the socket and drawn by said ring to a reduced diameter and to impinge upon the cable and compress the same, whereby the cable is forced inwardly with the sleeve for substantially the same distance as the sleeve is moved longitudinally and the sleeve is deformed, thereby displacing a peripheral portion of the cable enclosed therein.

2. A connecter for connecting stranded wire electric cables comprising a union having a cylindrical socket in one end thereof with a closed bottom and threaded exteriorly at its outer end, said outer end being beveled interiorly to provide an entrance throat, a substantially cylindrical sleeve of the same internal diameter as the socket and having a long taper on its inner end terminating in a substantially sharp fin for engagement with said beveled throat, and a shell threaded at its inner end for engagement with said threaded socket, and having an internal peripheral recess fitting closely over the sleeve, said shell also being of approximately the same internal diameter as the socket and having a beveled inlet for the cable, the arrangement being such that the parts may be assembled before the cable is inserted therein, and the cable then passed through all of said parts with its end abutting against the bottom of the socket preparatory to completing the coupling.

3. In a connecter for connecting stranded wire electric cables, the combination of a body having a threaded tubular projection with a closed bottom, the outer end of said projection being beveled interiorly, a cylindrical sleeve of substantially the same internal diameter as said tubular projection and having a long taper at its inner end for engagement with said beveled portion, and a shell threaded at its inner end for engagement with said threaded tubular projection and having an internal recess fitting closely over the sleeve, said shell being of approximately the same internal diameter as the socket and adapted to fit closely over the cable, the arrangement being such that after the connection has been made the sleeve will be pressed into engagement with the cable, and the end of the cable will be pressed against the bottom of the projection and the sleeve will be entirely enclosed by the engaging parts.

KENNETH M. MOODY.